Oct. 9, 1934.  H. C. WRIGHT  1,975,819
AUTOMATIC ELECTRIC IRON
Filed Aug. 13, 1930  3 Sheets-Sheet 1
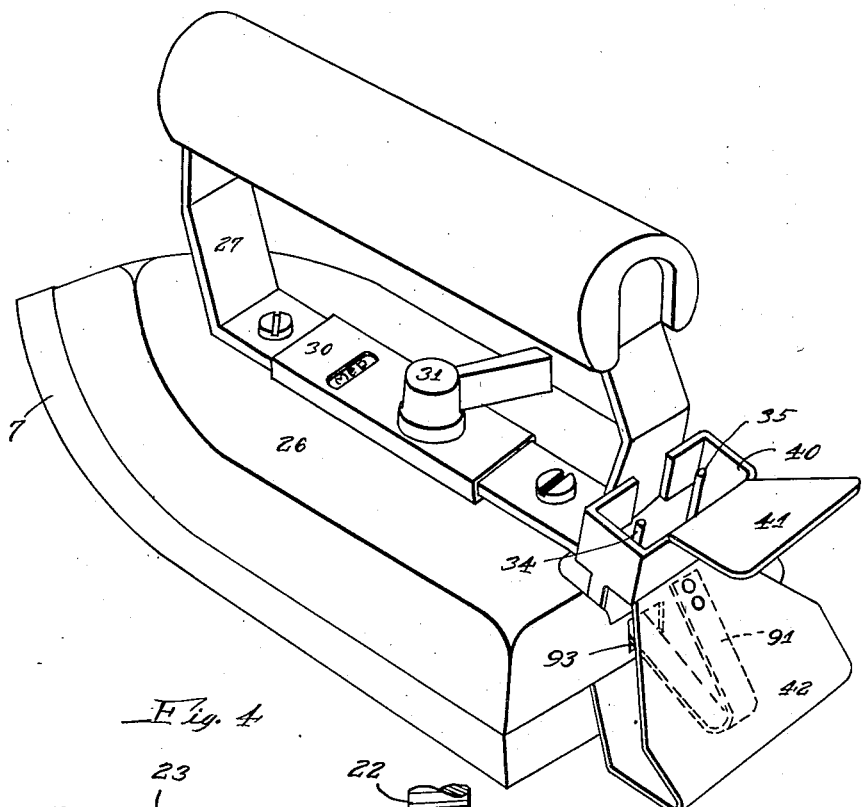
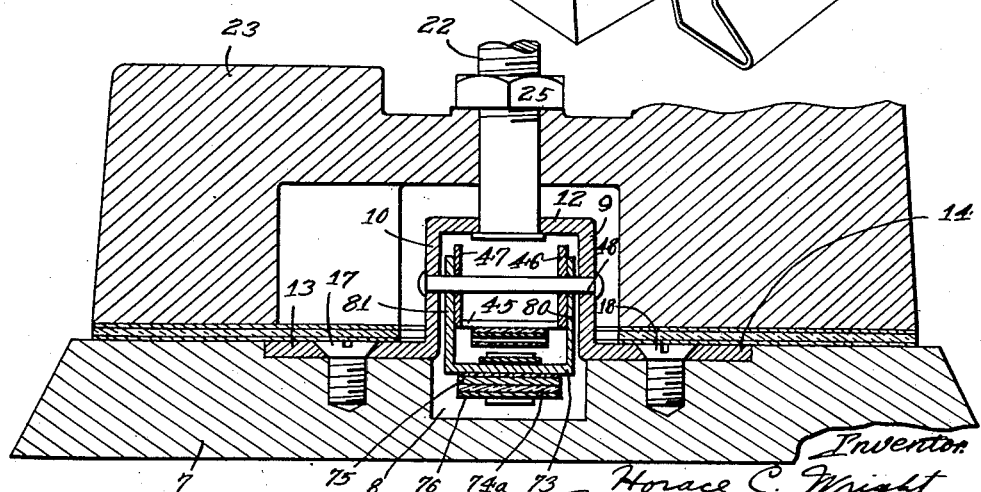

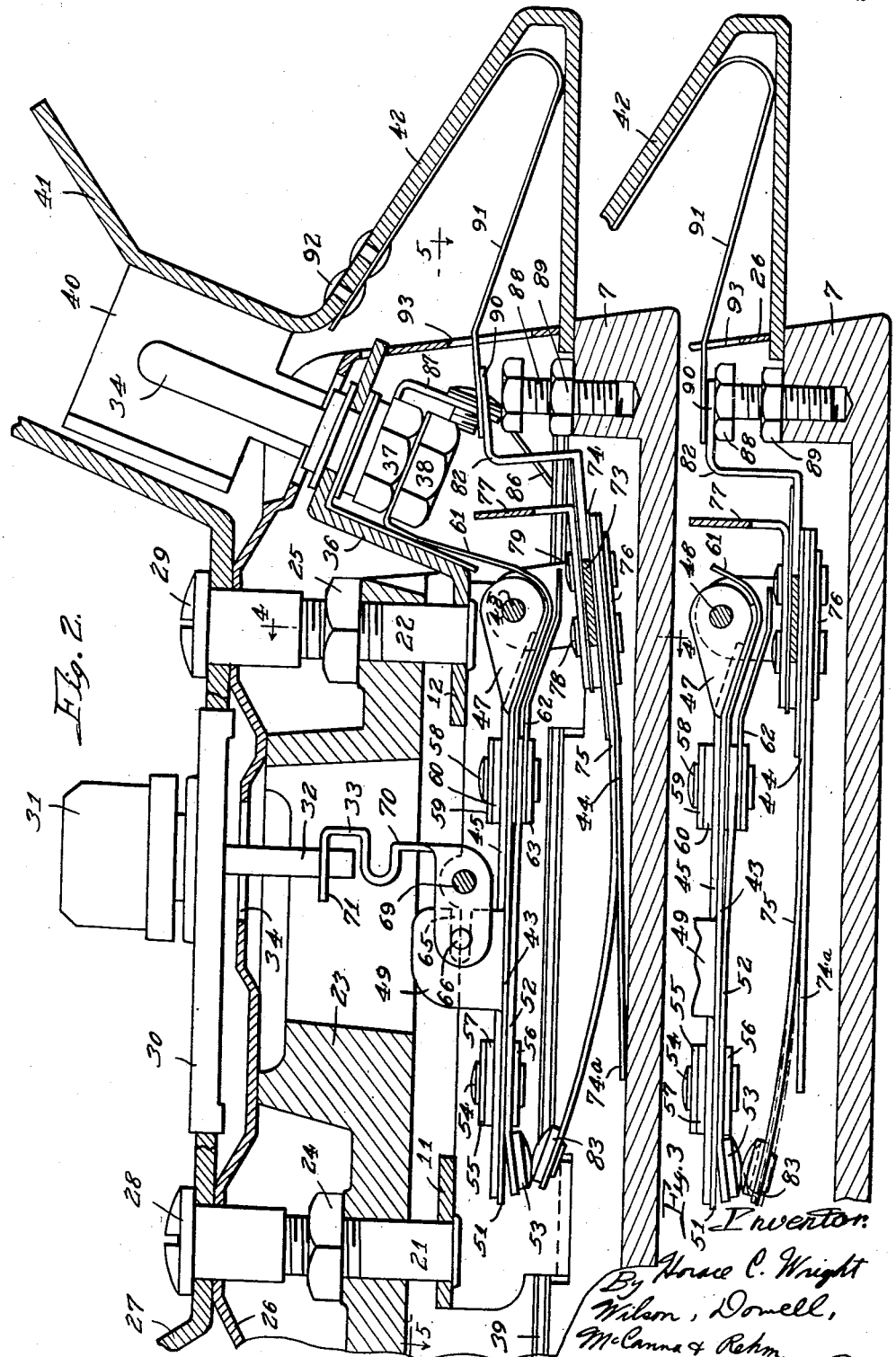

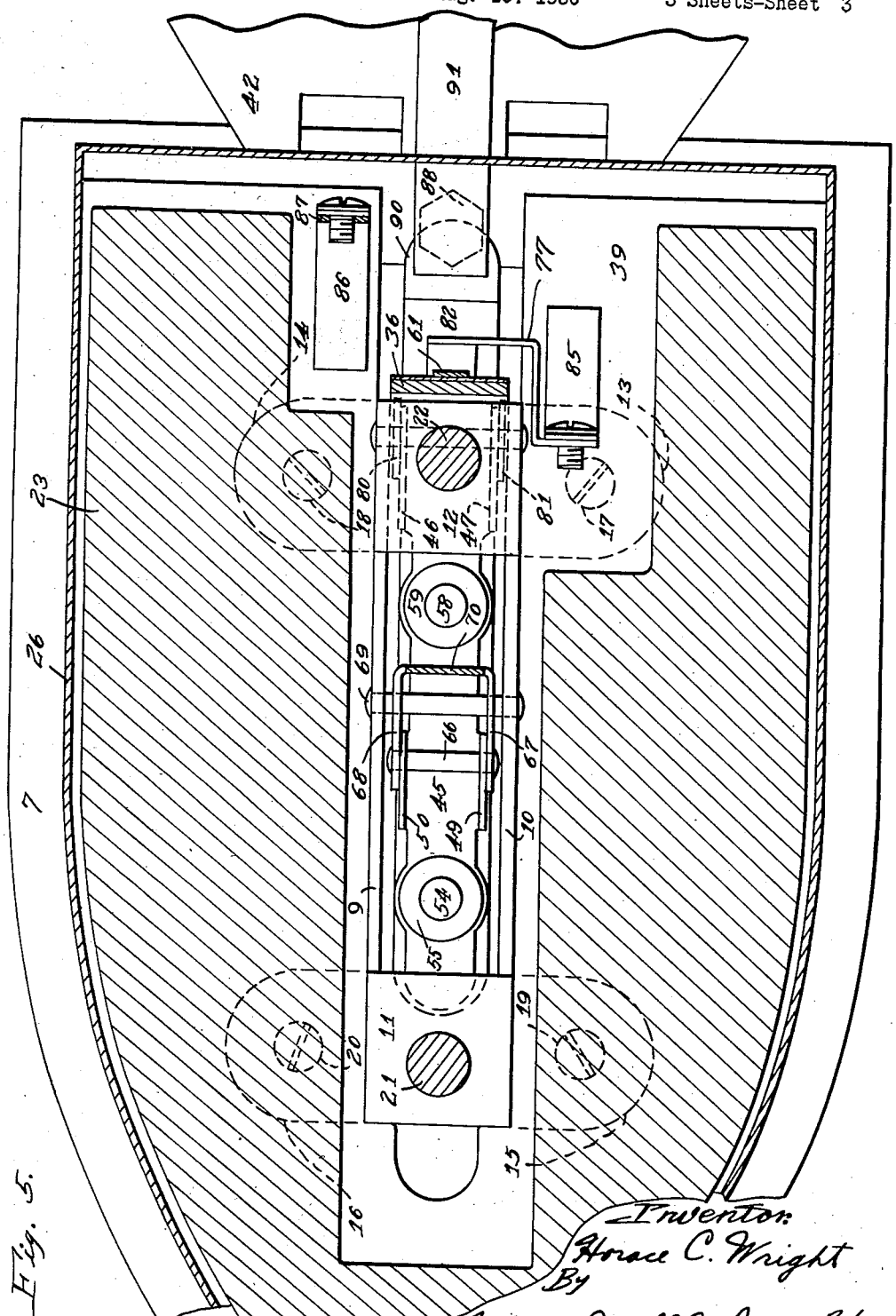

Patented Oct. 9, 1934

1,975,819

UNITED STATES PATENT OFFICE 1,975,819

AUTOMATIC ELECTRIC IRON

Horace C. Wright, Chicago, Ill., assignor to Chicago Flexible Shaft Company, Chicago, Ill., a corporation of Illinois Application August 13, 1930, Serial No. 474,934

11 Claims. (Cl. 219—25)

My invention relates to electric irons and deals more particularly with automatically operated thermostatic means for controlling the temperature thereof.

Irons of the general type contemplated having thermostatic means for maintaining a constant ironing temperature, have become common. These irons have universally employed a spring situated in the interior of the iron for maintaining an electrical contact until the desired temperature is reached. As a result of the position of this spring in the interior of the iron, it is constantly exposed to the maximum heat of the iron. This heat is invariably sufficient to slowly remove the temper from the spring, as a result of which the temperature at which the circuit is broken is gradually decreased while the iron is in service. Until the event of the present invention this has been a highly undesirable attribute of thermostatically controlled irons. The manufacturer has placed the iron on the market adjusted to break the circuit at a suitable ironing temperature. After the iron has been placed in service for a short period of time the user finds that the iron cannot be heated sufficiently high to permit satisfactory ironing operations. As a general rule, the iron is then returned to the manufacturer as being defective, the whole process involving a loss not only to the manufacturer but to the user.

I have, therefore, aimed to provide a thermostatically controlled electric iron wherein the temperature at which the circuit is broken will remain constant during prolonged use.

Another object of the invention is to provide an electric iron wherein the contact spring is prevented from becoming excessively heated whereby the tension normally exertable thereby is caused to remain substantially constant throughout a prolonged period of use.

A further object of the invention is to provide a thermostatically controlled electric iron wherein the contact spring is located outside the cover of the iron, where it comes in contact with cooling air currents and the temperature thereof is maintained at temperature below the point at which the temper will be removed.

I have also aimed to provide an electric iron having a thermostatic element mounted to rotate with the warping thereof and a spring acting thereon to cause rotation between limits to make and break an electrical contact within the iron.

Another object of the invention is to provide an electric iron having a contact point lever adjustable to provide different degrees of heat in the iron and a rotatable thermostatic element provided with means for breaking the electrical circuit when the desired temperature is reached.

Other objects and attendant advantages will become apparent to those skilled in the art from the following description and the accompanying drawings in which—

Figure 1 is a perspective view of the iron embodying my invention showing the contact spring in dotted lines;

Fig. 2 is a longitudinal section through the iron showing the position of the lower contactor bar when the iron is cold;

Fig. 3 is a longitudinal section similar to that shown in Fig. 2 showing the position of the contactor bar at operating temperatures;

Fig. 4 is a section on the line 4—4 of Fig. 2 showing the pivotal mounting of the upper and lower contactor bars, and Fig. 5 is a section on the line 5—5 of Fig. 2 showing a top view of the thermostat and thermostat mounting bridge.

The present invention contemplates an iron arranged to be heated by electrical heating elements suitably positioned therein. Thermostatic means are provided for breaking the electrical circuit through the iron when it has reached a predetermined temperature. This means includes a pair of spaced contactor bars suitably positioned in the iron arranged to permit current to flow when they are in contact and to stop the flow thereof when out of contact. One of the bars embodies a bimetallic element arranged to warp away from the opposite bar with increasing temperature. The latter bar is pivotally mounted and a spring is arranged to rotate it to maintain it in contact with the opposite bar during the warping of the element until a predetermined amount of warpage has taken place. A stop is provided to prevent the bar from being further rotated whereby continued warping of the thermostatic element causes the electrical circuit to be broken and the heat to be shut off. When the iron cools slightly the electrical contact is again made to maintain the iron at a suitable operating temperature. Means are provided for manually adjusting the position of one of the contactor bars to regulate the operating temperature of the iron between limits.

Referring to the drawings, an electric iron of conventional design having the usual sole plate indicated generally by the numeral 7, has a central longitudinal depression 8 arranged to receive the thermostat presently to be described. A thermostat mounting bridge having side walls 9 and 10, upper connecting portions 11 and 12, and outwardly projecting ears 13, 14, 15 and 16 is secured to the sole plate 7 by means of screws 17, 18, 19 and 20, passing through the ears and into the sole plate 7. Recesses are provided in the sole plate to receive the ears so that they will rest flush with the top of the plate as shown in Fig. 4. Upwardly projecting threaded center posts 21 and 22 are positioned in the portions 11 and 12 by riveting or otherwise and serve to support a conventional weight 23 which is forced downward against the sole plate by means of nuts 24 and 25. A cover designated generally by the numeral 26 is secured to the center posts 21 and 22 by means of cap screws 28 and 29 passing through openings in the cover and handle strap 27, respectively. Means including a heat indicating slide 30, and a heat control lever 31 having a pin 32 projecting downward therefrom through the cover 26, serve to actuate a heat adjusting lever 33, presently to be described. Rotation of the handle 31 causes the heat indicating slide 30 to move forward or backward on the handle strap 27 and the pin 32 to move forward or backward in the opening 34 of the cover 26.

Terminal contacts 34 and 35 are positioned in an upwardly projecting arm 36 formed integral with the connecting portion 12 of the thermostat mounting bridge by means of nuts 37 and 38 which also serve to form suitable electrical connections between the terminal contacts and the conventional heating element 39 interposed between the sole plate and the weight 23. A heel rest is secured to the cover 26 and includes an upwardly projecting portion 40 positioned around the terminal contacts 34 and 35 having an upwardly projecting end 41 and a backwardly projection portion 42, the iron being arranged to be rested in a vertical position upon the portion 42 and the end 41.

The thermostat to which this invention is particularly directed consists of an upper contactor bar designated generally by the numeral 43 and a lower contactor bar designated generally by the numeral 44. The upper contactor bar includes a top contact point lever indicated generally by the numeral 45 having a pair of spaced ears 46 and 47 at one end thereof adapted to pivotally receive a pin 48 which is fixedly secured in the side walls 9 and 10 of the thermostat mounting bridge, as shown in Fig. 4. The lever 45 is provided with a pair of upturned ears 49 and 50 intermediate the ends thereof adapted to serve in the adjustment of the upper contactor bar as will presently be described. A strip of mica 51 is positioned on the lower side of the contact point lever 45. Beneath the strip of mica is positioned a contact point rod 52 having a contact point 53 secured at the outer end thereof. The lever 45, the mica strip 51 and the contact rod 52 are secured together by means of a rivet 54 passing therethrough near the forward end thereof, having metal washers 55 and 56. The rivet 54 and the metal washer 55 are insulated from the lever 45 by a mica washer 57 interposed therebetween. A second rivet 58, having a metal washer 59 and a mica washer 60 on the upper side thereof, passes through the lever 45, the mica strip 54 and the contact rod 52 near the rear ends thereof, a contact point lead 61 being interposed between the contact rod 52 and the mica strip 51 and receiving the rivet 58 whereby electrical contact is made between the contact rod 52 and the terminal contact 34. A second mica strip 62 is secured between the contact rod 52 and a lower metal washer 63 and projects outward beyond the end of the contact lever 45 to prevent the lead 61 from coming in contact with other metallic portions of the device. The rivets 54 and 58 act to suitably connect the various portions of the upper contact bar together, whereby they are caused to rotate about the pin 48 as a unit, electrical contact being made between the contact point 53 and the terminal contact 34 through the contact rod 52 and the contact point lead 61.

Means are provided for raising or lowering the contact bar 43 and thereby the contact point 53 through the ears 49 and 50. Referring to Fig. 2, each of these ears is provided with a slot 65 adapted to slidably receive a pin 66. The pin 66 is fixedly positioned in spaced ears 67 and 68 on the lever 33, the lever 33 being pivotally supported upon a pin 69 secured at opposite ends in the side walls 8 and 9 of the thermostat mounting bridge. The lever 33 has an upwardly projecting portion 70 ending in a horizontal portion 71 provided with an opening to receive the pin 32 of the handle 31. As the handle 31 is rotated moving the pin 32 to the left facing Fig. 2, the lever 33 will be rotated about the pin 69 moving the pin 66 downward and thereby moving the contact point 53 downward. Movement of the adjusting lever 31 in the opposite direction will likewise cause the contact point 53 to be moved upward.

The lower contactor bar 44 consists of a pivotally supported portion 73, a mica strip 74, a bi-metallic element 75, a mica strip 74a, a washer 76, and an electric contactor 77 secured together by means of rivets 78 and 79. The portion 73 is provided with a pair of ears 80 and 81 pivotally supported upon the pin 48 and a backwardly projecting lever 82 presently to be more fully described. The bi-metallic element 75 is formed to a suitable shape as shown in Fig. 2 and is provided at its free end with a contact point 83 arranged to bear upwardly against the contact point 53. The mica strip 74a extends outward along the bi-metallic element 75 and therebeneath to prevent electrical contact between the sole plate 7 and the bi-metallic element. Electrical contact is made between the bi-metallic element 75 and the electrical connector 77.

Thus the electrical circuit through the iron is formed by the terminal contact 34, the contact point lead 61, the contact point bar 52, the contact point 53, the contact point 83, the bi-metallic element 75, the electrical connector 77, which is connected to one end of the resistance element through a contact point 85, a heating element lead 86, a terminal lead 87 and the terminal contact 35.

The contactor bar lever 82 is caused to project backward and upward from the contactor bar 44 to a point near the rear end of the cover 26. An adjusting stud 88 is positioned under the end 90 of the lever 82 in the sole plate 7 and provided with a lock nut 89 to secure it in a desired position. The adjusting stud 88 is positioned to stop the downward movement of the lever 82 and consequently to limit the rotation of the lower contactor bar 44 in one direction. A spring 91 is secured in the portion 42 of the heel rest by means of rivets 92, passing through an opening 93 in the rear end of the cover 26 with the free end thereof bearing downward on the end 90 of the lever 82, thus continuously urging the lower contactor bar 44 upward and the contact point 83 against the contact point 53.

As current passes through the iron and the heating element the sole plate, weight, and other portions thereof become heated. The bi-metallic element 75 of the lower contactor bar 44 is so arranged that as the temperature increases the bi-metallic element tends to straighten out as shown in Fig. 3. This straightening of the bi-metallic element 75 tends to draw the contact point 83 away from the contact point 53. Tension of the spring 91 on the lever 82, however, causes rotation of the pivotally supported portion 73 about the pin 48, thus maintaining the contact point 83 against the contact point 53. Rotation of the lower contactor bar 44 will continue as the bi-metallic element straightens out, until the lever 82 comes into contact with the adjusting stud 88. At this point further rotation of the contactor bar 44 is prevented, whereupon continued straightening of the bi-metallic element 75 causes the contact point 83 to move away from the contact point 53 as shown in dotted lines in Fig. 3, whereby electric current ceases to flow in the circuit and the iron is no longer heated. However, when the iron cools slightly the bi-metallic element 71 will increase its curvature bringing the contact point 83 again into contact with the contact point 53, thereby again closing the circuit and causing the iron to be heated.

When the adjusting lever 31 is rotated so that the upper contactor bar 43 is moved to its lowermost position, the contact point 83 will remain against the contact point 53 a greater period of time and until the bi-metallic element 75 has straightened out to a greater extent than any other position of the adjusting lever 31. Consequently a higher temperature will be attained before the contact points 83 and 53 separate. On the other hand, when the adjusting lever 31 is moved so that the contact point 53 is in its uppermost position, the circuit will be broken at a lower temperature. Means are thereby provided for the operator to regulate to a limited extent the temperature of the iron. The adjusting stud 88 is adjusted or set at the factory so that the range through which the operator may adjust the temperature will be that range suitable for customary ironing operations.

The advantages of my improved construction should have become apparent to those skilled in the art. It should be observed that the spring 91 which maintains the contact points 83 and 53 together, during the heating of the iron, is almost completely outside the cover of the iron. The spring 91 is thus at all times in contact with the cool air surrounding the iron and never reaches a temperature sufficient to remove the temper therefrom.

The construction of my improved iron is comparatively simple and such that it may be manufactured at a relatively low cost.

Because of the location of the spring whereby the temper is not removed therefrom by prolonged use of the iron the electrical circuit within the iron will always be broken at substantially the desired temperature and the efficiency of the iron will not diminish after prolonged use.

While I have thus described and illustrated a specific embodiment of my invention, I am aware that numerous alterations and changes may be made therein without materially departing from the spirit of the invention and I do not wish to be limited except as required by the prior art and the scope of the appended claims in which—

I claim:

1. A thermostatically controlled electric sad-iron having in combination an electrical heating circuit, a pivotally supported bi-metallic element, a contact point on the element normally closing said circuit, spring means arranged to rotate said element to hold said contact point in a position to close said circuit during the warping of said element in a direction to open said circuit, and stop means for limiting the rotation of said element when said iron reaches a predetermined temperature whereby continued warping of the element opens said circuit.

2. A thermostatically controlled electric iron, having in combination, a bi-metallic element pivotally supported intermediate its ends near the heated portion of said iron, a contact point at one end thereof, means arranged to close the heating circuit of said iron by contact of said contact point, spring means for rotating said element to maintain said contact point against said first mentioned means as said element is warped, and means for stopping rotation of said element at a desired point, whereby further warping of said element causes said circuit to be opened.

3. The combination in a thermostatically controlled electric iron of a bi-metallic element pivotally supported at one end near the heated portion of said iron, a contact point at the opposite end thereof, means arranged to close the heating circuit of said iron by contact of said contact point, spring means at a relatively cool point on said iron for rotating said element to maintain said contact point against said first mentioned means as said element is warped, and means for stopping rotation of said element at a desired point, whereby further warping of said element causes said circuit to be opened.

4. The combination in a thermostatically controlled electric iron having a cover, of an upper contactor bar pivotally supported in said iron, having an upper contact point, a lower contactor bar pivotally supported in said iron beneath said upper bar, a bi-metallic element in said lower bar arranged to warp away from said upper bar with increasing temperature, a contact point on said element arranged to close a heating circuit by contact with said upper contact point, a spring outside said cover for rotating said lower contactor bar to maintain said points in contact as said element warps with increasing temperature, means for stopping the rotation of said lower contactor bar at a predetermined point, whereby further warping of said element separates said contact points and opens said circuit, and means for raising and lowering said upper contactor bar to regulate the temperature at which said circuit will be opened.

5. The combination in a thermostatically controlled electric iron, of a heel rest, an upper contactor bar pivotally supported in said iron, having an upper contact point, a lower contactor bar pivotally supported in said iron beneath said upper bar, a bi-metallic element in said lower bar arranged to warp away from said upper bar with increasing temperature, a contact point on said element arranged to close a heating circuit by contact with said upper contact point, a spring outside said cover secured to said heel rest, for rotating said lower contactor bar to maintain said points in contact as said element warps with increasing temperature, means for stopping the rotation of said lower contactor bar at a predetermined point whereby further warping of said element separates said contact points and opens said circuit, and means for raising and lowering said upper contact bar to regulate the temperature at which said circuit will be opened.

6. The combination in a thermostatically controlled electric iron having a cover, of a pivotally supported upper contactor bar, a lower contactor bar pivotally supported intermediate its ends including a bi-metallic element projecting in one direction from the point of support, and a lever projecting in the opposite direction from the point of support, and a spring outside said cover arranged to bear against said lever to normally maintain said contactor bars in contact, and means for stopping rotation of the lower bar at a predetermined temperature whereby continued warpage of said element separates said bars.

7. The combination in a thermostatically controlled electric iron having a cover, of an upper contactor bar pivotally supported in said iron in a horizontally disposed position, a lower contactor bar pivotally supported in said iron beneath said upper bar, said lower bar including a bi-metallic element projecting toward the forward end of said iron from the point of support, and a lever projecting toward the rear end of said iron from the point of support, and a spring outside said cover having an end thereof projecting through said cover against said lever to urge the latter downward and normally maintain said bi-metallic element against said upper contactor bar, and means for stopping rotation of the lower bar at a predetermined temperature whereby continued warpage of said element separates said bars.

8. The combination in a thermostatically controlled electric iron having a cover, of an upper contactor bar pivotally supported in said iron in a horizontally disposed position, a lower contactor bar pivotally supported in said iron beneath said upper bar, said lower bar including a bi-metallic element projecting toward the forward end of said iron from the point of support, and a lever projecting toward the rear end of said iron from the point of support, a spring outside said cover having an end thereof projecting through said cover against said lever to urge the latter downward and maintain said bi-metallic element against said upper contactor bar until a predetermined temperature is reached, and adjustable means for stopping movement of said lever when said temperature is reached.

9. In a thermostatically controlled electric iron having a cover and a heel rest, a thermostatic unit inside said cover and an exposed flat strip spring on the exterior of the cover supported within and protected by said heel rest, one end of the spring being secured to said heel rest and the other end thereof passing through said cover to operate said unit.

10. In a thermostatically controlled electric iron, a normally fixed contact point movable to adjust the operating temperature of the iron, a second contact point normally in contact with said fixed point to close the electric circuit, and means for separating and bringing said points together to maintain a constant operating temperature comprising a bi-metallic blade arranged to rotatably support said second contact point, spring means at a cool point in said iron for rotating said blade proportional to the warping thereof, and means for stopping said rotation at the operating temperature.

11. A thermostatically controlled electric iron having, in combination, a pair of contact points for controlling the circuit through the iron, spring means for normally maintaining said points in contact, a bi-metallic element pivotally supported intermediate its ends in a position to be responsive to the temperature of the iron, said element rotating on its pivotal support during warpage of the element below the operating temperature of the iron, and means for terminating the rotation at the operating temperature for the separation of said points by said element through continued warpage thereof.

HORACE C. WRIGHT.